United States Patent
Foley et al.

(10) Patent No.: US 9,416,847 B2
(45) Date of Patent: Aug. 16, 2016

(54) CAPTURE BLOCK ASSEMBLY FOR RETAINING SHACKLES

(71) Applicant: FOLEY PATENTS, LLC, Abbeville, LA (US)

(72) Inventors: Lawrence E. Foley, Lafayette, LA (US); Scott C. Foley, Abbeville, LA (US)

(73) Assignee: Foley Patents LLC, Abbeville, LA (US)

( * ) Notice: Subject to any disclaimer, the term of this patent is extended or adjusted under 35 U.S.C. 154(b) by 0 days.

(21) Appl. No.: 14/790,816

(22) Filed: Jul. 2, 2015

(65) Prior Publication Data

US 2016/0002008 A1      Jan. 7, 2016

Related U.S. Application Data

(60) Provisional application No. 62/020,610, filed on Jul. 3, 2014.

(51) Int. Cl.
| | |
|---|---|
| *B66C 1/12* | (2006.01) |
| *F16G 11/00* | (2006.01) |
| *F16G 11/14* | (2006.01) |
| *F16G 15/06* | (2006.01) |

(52) U.S. Cl.
CPC . *F16G 11/00* (2013.01); *B66C 1/12* (2013.01); *F16G 11/146* (2013.01); *F16G 15/06* (2013.01)

(58) Field of Classification Search
CPC ......... F16G 11/00; F16G 11/06; F16G 11/12; F16G 11/146; F16G 15/02; F16G 15/06; B66C 1/12; B66C 1/122; B66C 1/125; B66C 1/14; D07B 1/185
USPC .................................. 294/74, 82.11; 403/210
See application file for complete search history.

(56) References Cited

U.S. PATENT DOCUMENTS

| | | | | |
|---|---|---|---|---|
| 857,717 | A * | 6/1907 | Brown | F16G 11/00 24/135 A |
| 1,300,794 | A * | 4/1919 | Wendt-Wriedt | D07B 7/162 24/115 K |
| 2,272,933 | A * | 2/1942 | Conohan | F16G 11/04 24/135 A |
| 2,495,951 | A * | 1/1950 | Von Wehrden | F16G 11/00 294/74 |
| 5,016,026 | A * | 5/1991 | Flory | B63B 21/00 177/147 |
| 5,802,680 | A * | 9/1998 | Postelwait | F16G 11/06 24/135 N |
| 6,120,074 | A * | 9/2000 | Hamrick | A01K 73/06 294/74 |
| 6,282,879 | B1 * | 9/2001 | Bonaiti | F16G 15/06 59/86 |
| 8,256,981 | B2 * | 9/2012 | Lindsey | B66C 1/12 294/74 |
| 8,517,439 | B2 * | 8/2013 | Haun | B66C 1/36 294/74 |
| 2011/0265442 | A1 * | 11/2011 | Segura | B66C 1/10 59/86 |

* cited by examiner

*Primary Examiner* — Dean Kramer
(74) *Attorney, Agent, or Firm* — Ted M. Anthony

(57) ABSTRACT

A capture block assembly prevents unauthorized removal, swapping, interchanging or replacement of shackle members used with conventional wire rope sling assemblies. A first half member is permanently joined with a second half member within a thimble member of a sling loop, after a wire rope sling has been manufactured or assembled, to prevent removal of a shackle from such loop. No welding or other operations permanently affecting strength properties of the thimble or sling member is required.

14 Claims, 5 Drawing Sheets

CAPTURE BLOCK ASSEMBLY FOR RETAINING SHACKLES

CROSS REFERENCES TO RELATED APPLICATION

Priority of U.S. Provisional Patent Application Ser. No. 62/020,610, filed Jul. 3, 2014, incorporated herein by reference, is hereby claimed.

STATEMENTS AS TO THE RIGHTS TO THE INVENTION MADE UNDER FEDERALLY SPONSORED RESEARCH AND DEVELOPMENT

NONE

BACKGROUND OF INVENTION

1. Field of the Invention

The present invention pertains to a capture block assembly for use in preventing a shackle attached to a wire rope lifting assembly from being removed from said wire rope assembly without removal or destruction of said capture block assembly.

2. Brief Description of the Prior Art

Riggings of various types are commonly used in industrial applications, including, but not limited to, oil and gas well drilling, mining operations, the nuclear energy industry, and many others. In several of these applications, safety is a paramount concern, as such rigging equipment can be used for heavy overhead lifting; dropping or imprecise placement of such heavy loads can cause injury or death to personnel or property. Such heavy overhead lifting is often also dynamic in nature, frequently requiring heavy equipment to be lifted and moved using a pivoting crane.

In many such industrial rigging applications, wire rope is used with additional rigging hardware to form a sling assembly. Frequently, such wire rope sling assemblies include wire rope fittings, as well as termination hardware, which secure the ends of the wire rope together and prevent fraying. Often, such wire rope sling assemblies terminate in a loop, with a loose end of said loop being secured back onto the main wire rope body. A fitting or hardware (such as, for example, a clamp, a clip, a socket, and/or a swaged fitting) is typically used to secure said loose end back to said main wire rope body.

A thimble member is commonly used to preserve the natural shape of such a wire rope loop, particularly when exposed to loading. Such a thimble member provides a rigid surface along at least the inner surface of such a loop, and serves to prevent wire rope loops from bending too tightly when loaded. The thimble member prevents pinching and abrading of an inner surface of such a wire rope loop.

In many instances, shackles or other means can be used to connect the individual lines of a sling assembly to pad-eyes, lift lugs or other connection points of a load to be lifted. In conventional lifting applications utilizing existing shackle assemblies, a substantially U-shaped shackle having a mouth or opening is passed through the loop or eye of a sling or lifting cable. Thereafter, a bolt is threaded through aligned bores in said shackle and an opening in a lift lug or pad eye of a load to be lifted. Such shackles provide quick and efficient means for attaching a sling, cable, or other lifting device to a load to be lifted.

Said wire rope sling assemblies are often used in heavy duty lifting operations and, thus, can be placed under great loading stress and tension when in use. As a result, a component of said wire rope slings can sometimes fail or suffer damage during use, and users may replace individual components with spare parts from other sling assemblies. In many cases, said sling assemblies can be outfitted with cheaper or lower quality components, thereby compromising the overall integrity and lifting capacity of the wire rope sling assembly. In addition to being unsafe, this practice can subject a manufacturer and/or user of such a wire rope sling assembly to liability in the event of a failure.

National and international standards require that each component of wire rope sling assembly, including the shackles, be traceable to a record which can disclose information about the component, including, but not limited to, a material type, heat treatment, and a manufacturer of the individual components. If at least one shackle is changed or replaced without authorization, then a traceable record is no longer complete and accurate. It is therefore advantageous to incorporate a means whereby a shackle cannot be removed and replaced without permanent indication of such action.

Conventional means for capturing a shackle within a thimble member of a sling assembly involve welding on said thimble member. Such welding must be performed prior to assembly of the wire rope loop about the thimble. As such, the means for capturing the shackle must be performed during assembly of the wire rope sling. Moreover, it is not advisable or safe to perform welding on a thimble member after assembly of a wire rope sling assembly because the heat from the welding operations will be transferred through the thimble and into the wire rope, thereby changing the strength properties of said wire rope.

Thus, there remains a need for an improved wire rope sling assembly and components of said assembly that prevent unauthorized swapping or interchanging of shackle members between sling assemblies in the field. The improved sling assembly should permit capturing of a shackle within a loop thimble after a wire rope sling has been manufactured or assembled. Moreover, a shackle should be capable of being captured within a sling assembly loop thimble without requiring welding on said thimble.

SUMMARY OF THE PRESENT INVENTION

By way of illustration, but not limitation, the present invention comprises a capture block assembly for use in rigging hardware including, without limitation, wire rope sling assemblies. Specifically, said capture block assembly can be used to prevent a shackle of a wire rope sling assembly from being removed from said wire rope sling assembly, thereby preventing unwanted swapping, interchanging or replacement of said shackles. Additionally, the present invention beneficially permits issuance of a single safety certification for an entire lifting assembly, rather than requiring certification of each individual component thereof.

In a preferred embodiment, the capture block assembly of the present invention can be installed within a thimble of an existing wire rope sling assembly loop, after a shackle has been installed in said thimble, so that said capture block assembly prevents removal of said shackle from said thimble/loop. Ideally, said capture block assembly is permanently installed, such that said capture block and/or shackle cannot be removed from said loop/thimble without causing easily observable damage to or destruction of said capture block assembly and/or said thimble. In a preferred embodiment, the present invention pertains to a capture block assembly comprising component parts that cannot be replaced, switched, or separated easily from one another without apparent damage to or destruction of said capture block assembly.

In a preferred embodiment, the capture block assembly of the present invention comprises a plurality—typically two (2)—of identical capture block half members. Each of said capture block half members has an outer face and an inner face. In a preferred embodiment, a first capture block half member is inverted relative to a second capture block half member, such that the inner face of the first capture block half member is in proximal and/or abutting relationship to the inner face of the second capture block half member.

Said capture block members each have a concave or curved surface along a side, such that when a first capture block member and a second capture block member are assembled, the curved surfaces of said first capture block member and said second capture block member cooperate to form a substantially concave groove along the outer edges of said joined capture block members.

During installation, said first capture block member of the present invention can be disposed within a loop thimble of a wire rope sling assembly, such that the inner surface of said first capture block member is oriented substantially parallel to and proximal to a central axial plane of said loop. Said second capture block member of the present invention can be disposed within said loop thimble of said sling assembly opposite to said first capture block member, such that the inner surface of said second capture block member is oriented substantially parallel and proximal to the central axial plane of said loop. In this configuration, the inner surfaces of said first and second capture block members are in an opposed proximal and/or abutting relationship, while the curved outer surfaces of said first capture block member and said second capture block member cooperate to form a substantially concave groove that is substantially co-radial with an inside radius of said loop thimble of said wire rope assembly.

In a preferred embodiment, said first and second capture block members each have at least one transverse through bore oriented substantially perpendicular to the inner surfaces of said capture block members. A concentric countersunk recess is formed at the outer end or face of each through bore. Moreover, said at least one through bore is disposed symmetrically about a central plane oriented perpendicular to the inner surface of each capture block member.

In a preferred embodiment, the present invention further comprises at least one cylindrical pin or other fastener (such as, for example, a screw, bolt, rivet or other elongate member) that can be received within said at least one transverse through bore. By way of illustration, but not limitation, said cylindrical pin can comprise a security bolt (such as, for example a Hex-Pin® Security Bolt or a Tork-Bolts® Security Bolt) as a fastener that prevents loss or removal from the capture block assembly of the present invention. When installed, said at least one fastener acts as a rivet binding said first capture block member to said second capture block member, thereby permanently fixing the capture block assembly of the present invention within the thimble.

During use, an end loop of a conventional wire rope sling assembly is formed around a loop thimble member. A bolt is removed from a shackle, said shackle is installed through said thimble loop, and said bolt is replaced. With said shackle installed, the first and second capture block members of the present invention are then inserted within said loop thimble in opposing relationship and joined together using at least one fastener until said capture block assembly of the present invention is tightly and permanently fixed within said loop thimble. Thereafter, said shackle cannot be removed without removing said capture block assembly, which would require easily observable damage to or destruction of said capture block assembly.

BRIEF DESCRIPTION OF DRAWINGS

The foregoing summary, as well as any detailed description of the preferred embodiment, is better understood when read in conjunction with the drawings and figures contained herein. For the purpose of illustrating the invention, the drawings and figures show certain preferred embodiments. It is understood, however, that the invention is not limited to the specific methods and devices disclosed in such drawings or figures.

DETAILED DESCRIPTION OF A PREFERRED EMBODIMENT

Figure 1:
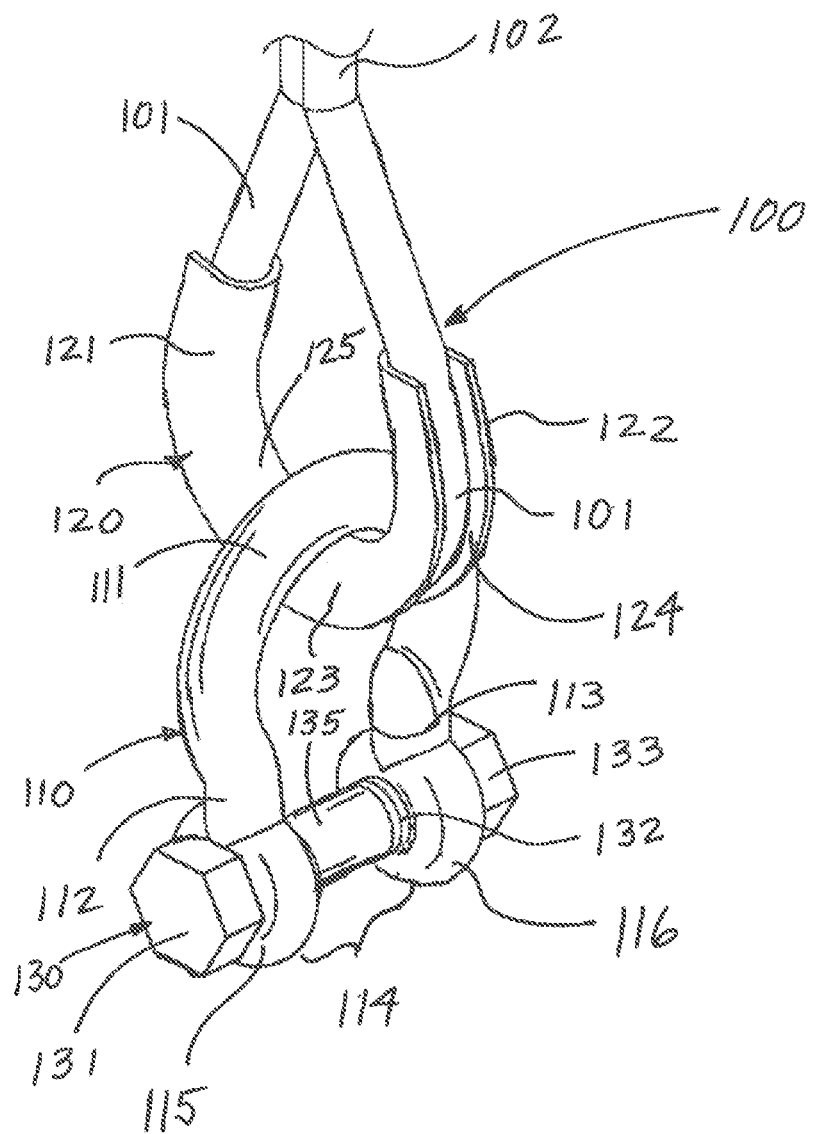
FIG. 1 depicts a side perspective view of a conventional wire rope sling assembly loop and shackle.

Referring to the drawings, FIG. 1 depicts a side perspective view of a portion of a conventional wire rope sling assembly 100. The portion of wire rope sling 100 depicted in FIG. 1 generally comprises a length of wire rope formed into loop section 101 and securely joined together at connection junction 102. A conventional fitting such as, for example, a clamp, clip, socket, or swaged fitting can be used to secure a loose end of said wire rope back to said main wire rope body at connection junction 102.

Substantially rigid thimble member 120 is installed within said loop section 101. Conventional thimble member 120 generally comprises first leg member 121, second leg member 122 and curved central arch member 123. A peripheral groove 124 extends substantially along the outer surface of said thimble member 120 for receiving wire rope loop 101 within said peripheral groove 124. Thimble member 120 further comprises curved inner surface 125 having a substantially convex outer shape.

Still referring to FIG. 1, conventional sling assembly 100 further comprises shackle member 110 having a curved, substantially U-shaped body section 111, first arm 112 and second arm 113. A throat or gap 114 is defined between said first arm 112 and second arm 113. Arms 112 and 113 of shackle 110 also include substantially parallel ends 115 and 116, respectively, having aligned coaxial transverse bores for receiving a bolt 130 or other rigid member. Bolt 130 comprises head 131 and external threads 132, and is secured in place using threaded nut 133, disposed on said threads 132.

During use, gap 114 of shackle 110 is first passed through loop 101. Coaxial transverse bores of said shackle 110 are aligned with an opening in a lift lug or pad eye of a load to be lifted, and bolt 130 is thereafter inserted through said aligned coaxial bores, as well as said opening in the padeye of the load to be lifted (not shown in FIG. 1). Bolt 130 can be rotated so that external threads 132 of said bolt 130 mate with internal threads of nut 133.

Figure 2:
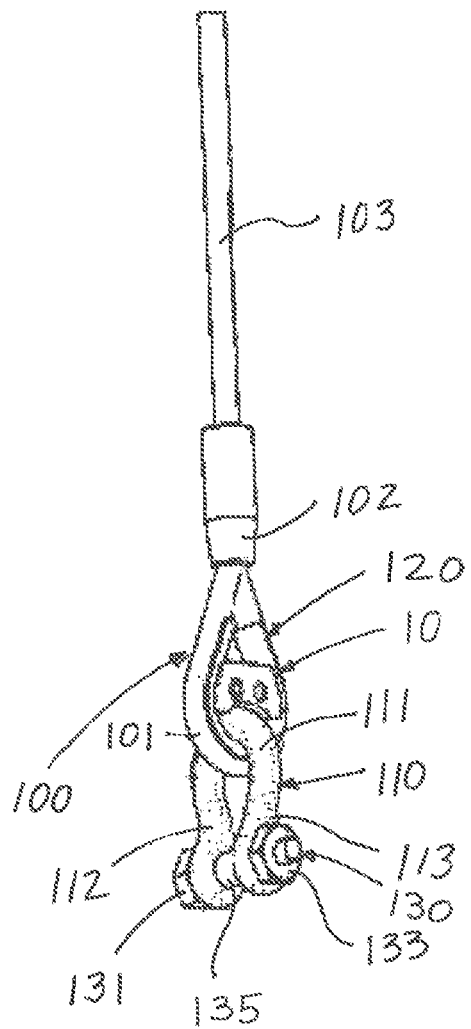
FIG. 2 depicts a side perspective view of a preferred embodiment of the capture block assembly of the present invention installed on a conventional wire rope sling assembly.

FIG. 2 depicts a side perspective view of a preferred embodiment of the capture block assembly 10 of the present invention installed on a conventional wire rope sling assembly 100. Sling assembly 100 depicted in FIG. 2 generally comprises a length of wire rope 103 formed into loop section 101 and securely joined together with a fitting at connection junction 102. Substantially rigid thimble member 120 is installed within said loop section 101. Shackle member 110 having substantially U-shaped body section 111, first arm 112 and second arm 113 is disposed through said loop section 101. Bolt 130 having body section 135, head 131 and external threads 132 (not visible in FIG. 2) is secured in place using threaded nut 133. As depicted in FIG. 2, capture block assembly 10 is disposed within thimble member 120.

Figure 3:
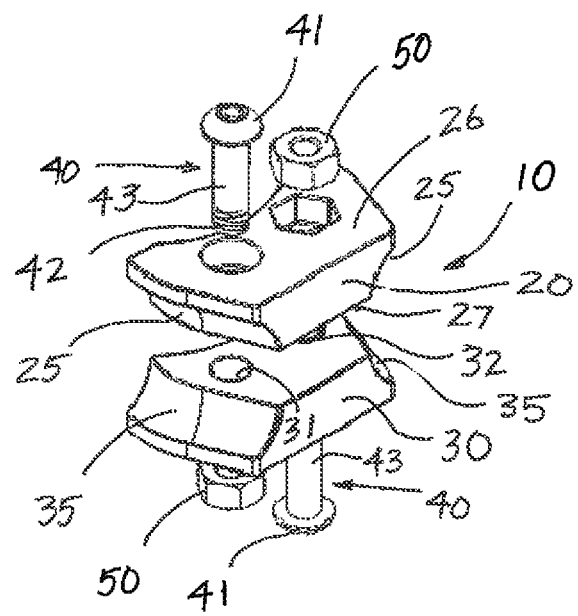
FIG. 3 depicts a side perspective exploded view of a preferred embodiment of the capture block assembly of the present invention.
Figure 4:
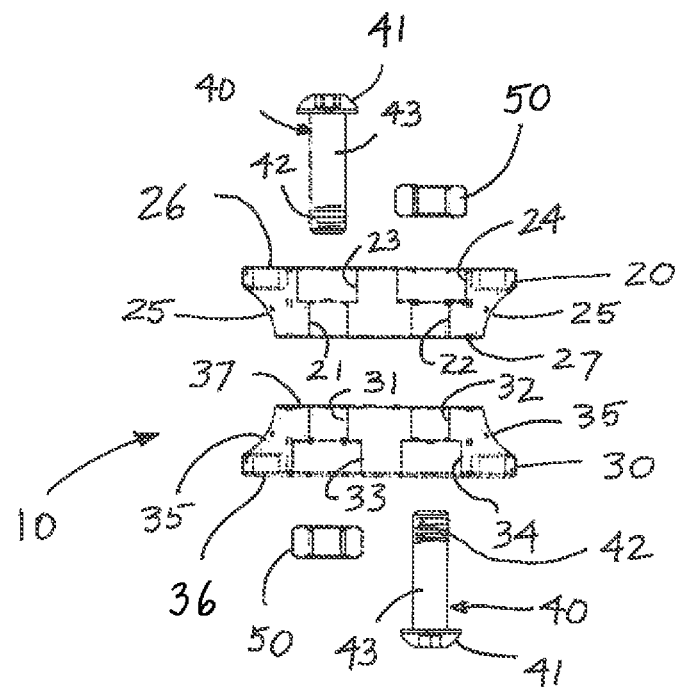
FIG. 4 depicts a side sectional exploded view of a preferred embodiment of the capture block assembly of the present invention.

FIG. 3 depicts a side perspective exploded view of a preferred embodiment of capture block assembly 10 of the present invention, while FIG. 4 depicts a side sectional exploded view of a preferred embodiment of said capture block assembly 10 of the present invention. Referring to FIGS. 3 and 4, said capture block assembly comprises a plurality—typically two (2)—of identical capture block members. Specifically, said capture block assembly 10 comprises first half block member 20 and second half block member 30. First half member 20 has outer surface 26 and inner surface 27, while second half member 30 has outer surface 36 and inner surface 37. In a preferred embodiment, inner surface 27 of first capture block half member 20 is positioned proximal to and/or in abutting relationship with inner surface 37 of second capture block half member 30.

Said capture block half members 20 and 30 each have a concave curved surface along outer side or edge surfaces—first capture block half member 20 has curved side edges 25, while second capture block half member 30 has curved side edges 35. When first capture block half member 20 and second capture block half member 30 are assembled, said curved side edges 25 of said first capture block half member 20 and said curved side edges 35 of said second capture block half member 30 cooperate to define substantially concave grooves along the outer side edges of said joined capture block members. Said concave grooves formed along the outer side edges of said joined capture block members contact, and substantially conform to the curvature of, the inner surface of thimble member 120.

In a preferred embodiment, said first and second capture block members 20 and 30 each have at least one transverse through bore oriented substantially perpendicular to the inner surfaces of said capture block half members 20 and 30. First transverse bore 21 and second transverse bore 22 extend through first capture block half member 20, while first transverse bore 31 and second transverse bore 32 extend through second capture block half member 30. Concentric countersunk recess 23 is formed at the outer end of first transverse bore 21, while concentric countersunk recess 24 is formed at the outer end of second transverse bore 22. Similarly, concentric countersunk recess 33 is formed at the outer end of first transverse bore 31, while concentric countersunk recess 34 is formed at the outer end of second transverse bore 32.

Still referring to FIGS. 3 and 4, cylindrical bolt fasteners 40, each having a head 41, body section 43 and external threads 42, are received within said aligned transverse through bores. Nuts 50 can be received on and mate with external threads 42. By way of illustration, but not limitation, said cylindrical bolt fasteners 40 can comprise security or tamper-proof bolts (such as, for example a Hex-Pin® Security Bolt or a Tork-Bolts® Security Bolt) as fasteners that prevent unauthorized loss or removal from capture block assembly 10 of the present invention. When installed, said fasteners 40 and nuts 50 secure said first capture block half member 20 to said second capture block member 30.

Figure 5:
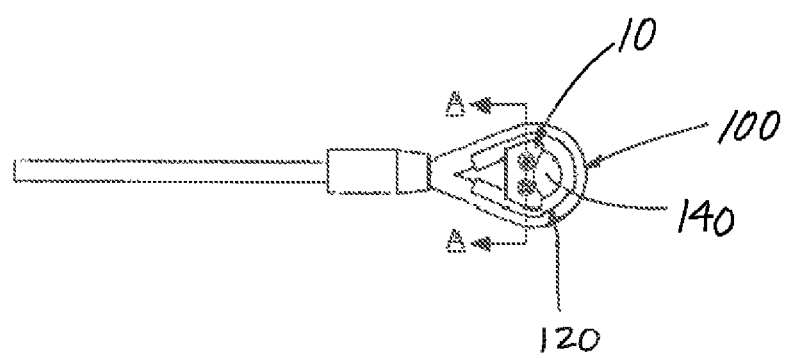
FIG. 5 depicts a side view of a preferred embodiment of the capture block assembly of the present invention installed on a conventional wire rope sling assembly.

FIG. 5 depicts a side view of a preferred embodiment of capture block assembly 10 of the present invention installed on a conventional wire rope sling assembly 100 which a shackle member removed for clarity. When installed, capture block assembly 10 is received within an opening of thimble member 120 of sling assembly 100. In this configuration, it is to be observed that gap 140 is formed between capture block assembly 10 and thimble member 120. Said gap 140 is large enough to accommodate a body section of a shackle member (such as, for example, body section 111 of shackle 110 depicted in FIG. 2) previously installed within thimble member 120. However, said gap 140 is not large enough to permit removal of a shackle from the opening formed by thimble member 120 following installation of capture block assembly 100.

Figure 6:
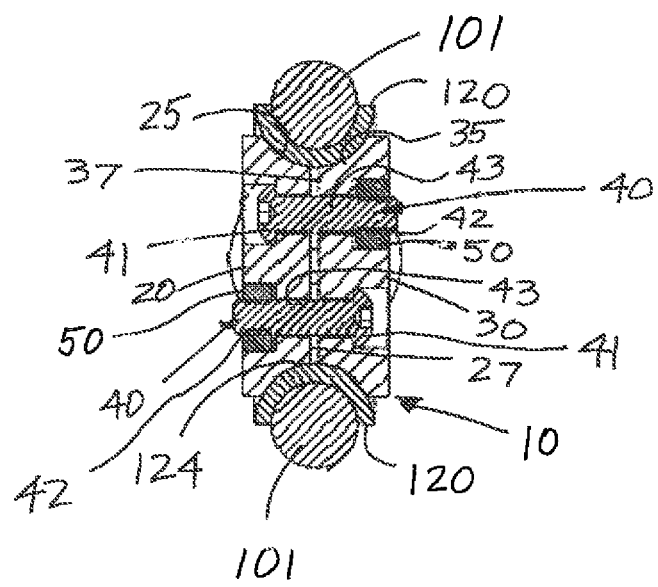
FIG. 6 depicts a side sectional view of the capture block assembly of the present invention along line A-A of FIG. 5.

FIG. 6 depicts a side sectional view of said capture block assembly 10 along line A-A of FIG. 5. During installation, first capture block half member 20 is disposed within a loop thimble 120 in loop 101 of a wire rope sling assembly 100. Second capture block half member 30 is likewise disposed within said loop thimble of said sling assembly opposite to said first capture block half member 20. In this configuration, inner surface 37 of said second capture block half member 30 and inner surface 27 of capture block half member 20 are in an opposed proximal relationship. Curved outer edge surfaces 35 of said second capture block half member 30 and curved outer edge surfaces 25 of said first capture block half member 20 cooperate to form a substantially concave grooves along the outer sides of said capture block assembly 10; said curved outer side surfaces are substantially co-radial with inner surface 124 of said thimble member 120 of sling assembly 100.

Bolt fasteners 40, each having a head 41, body section 43 and external threads 42, are received within aligned transverse through bores extending through mating capture block half members 20 and 30. Nuts 50 can be received on and mate with external threads 42 and are received in (and prevented from rotating by) countersunk recesses. When installed, said fasteners 40 and nuts 50 affix said first capture block half member 20 to said second capture block half member 30. In this configuration, capture block assembly 10 is fixed within the opening formed by said thimble member 120 and restricts said opening, thereby preventing removal of a shackle member from said thimble member 120 (such as, for example, in order to swap, interchange or replace said shackle) without easily observable damage to or destruction of capture block assembly 10. No welding or other operations permanently affecting strength properties of the thimble or sling member is required to install said capture block assembly 10.

Figure 7:
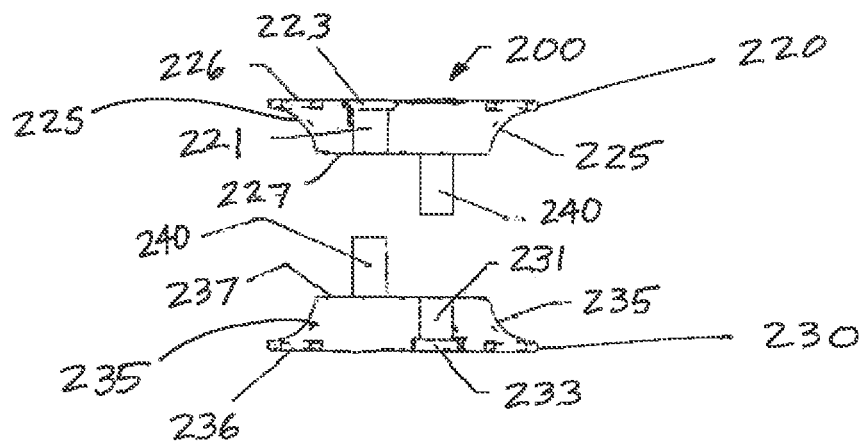
FIG. 7 depicts an exploded view of an alternative embodiment capture block assembly of the present invention installed on a conventional wire rope sling assembly.
Figure 8:
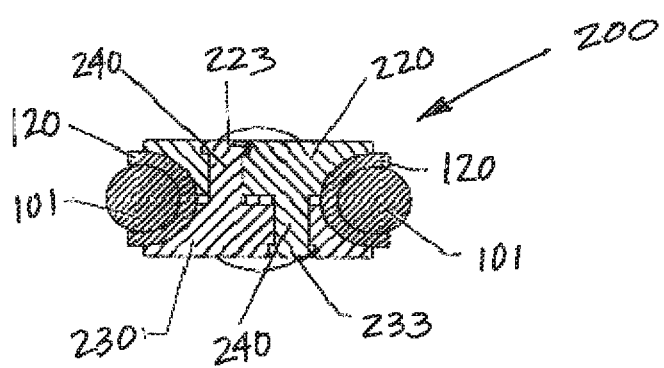
FIG. 8 depicts a side sectional view of the alternative capture block assembly depicted in FIG. 7.

FIG. 7 depicts an exploded view of an alternative embodiment capture block assembly 200 of the present invention, while FIG. 8 depicts a side sectional view of said alternative capture block assembly 200 installed on a conventional wire rope sling assembly having loop 101 and thimble member 120. Referring to FIGS. 7 and 8, alternative capture block assembly 200 comprises first half block member 220 and second half block member 230. First half member 220 has outer surface 226 and inner surface 227, while second half member 230 has outer surface 236 and inner surface 237. Inner surface 227 of first capture block half member 220 is positioned proximal to and/or in abutting relationship with inner surface 237 of second capture block half member 230.

Said capture block half members 220 and 230 each have a concave curved surface along outer side or edge surfaces—first capture block half member 220 has curved side edges 225, while second capture block half member 230 has curved side edges 235. When first capture block half member 220 and second capture block half member 230 are assembled, said curved side edges 225 of said first capture block half member 220 and said curved side edges 235 of said second capture block half member 230 cooperate to define a substantially concave groove along the outer side edges of said joined capture block members.

Said first and second capture block members 220 and 230 each have at least one transverse through bore oriented substantially perpendicular to the inner surfaces of said capture block half members 220 and 230. Transverse bore 221 extends through first capture block half member 220, while transverse bore 231 extends through second capture block half member 230. Concentric countersunk recess 223 is formed at the outer end of first transverse bore 221, while concentric countersunk recess 233 is formed at the outer end of transverse bore 231.

In said alternative embodiment capture block assembly 200 depicted in FIGS. 7 and 8, at least one elongate (typically cylindrical) pin 240 can be used to secure a first capture block half member 220 to a second capture block half member 230. In said alternative embodiment, a pin 240 extending from block half member 220 (and can be integrally formed with block half member 220) is aligned with, and can be received in, transverse bore 231 extending through opposing capture block half member 230. Similarly, a pin 240 extending from block half member 230 (which can be integrally formed with said block half member 230) is aligned with, and can be received in, transverse bore 221 extending through opposing capture block half member 220.

Referring to FIG. 8, the distal end of elongate pin 240 extending from first capture block half member 220 and received in aligned transverse bore 231 may be flared (similar a rivet fastener or the like) in concentric countersunk recess 233 formed at the outer end of transverse bore 231. Similarly, the distal end of elongate pin 240 extending from second capture block half member 230 and received in aligned transverse bore 221 may be flared (similar a rivet fastener or the like) in concentric countersunk recess 223 formed at the outer end of transverse bore 221.

In this manner, elongate pins 240 can be used to secure said alternative capture block half members 220 and 230 together, particularly if said elongate pins 240 are constructed of metal. Alternatively, said first and second capture block half members 220 and 230 may be glued together, particularly if components are constructed of plastic, urethane or synthetic material. In this embodiment, said capture block half members can be cast or molded with integrally formed pins.

When elongate pins 240 are used to join capture block half members 220 and 230, the ends of said pins 240 may be welded (rather than flared or glued) to the opposite half block member. While welding onto a thimble member is detrimental because such welding may change the metallurgy of said thimble member or the associated heat from such welding may affect the strength of a sling cable, focused welding on the capture block assembly of the present is acceptable because said capture block assembly is not a load-bearing component.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. An apparatus for securing a shackle within an opening of a sling loop thimble member, comprising a capture block adapted to be fixed within said opening of said thimble member, wherein said capture block restricts said opening of said thimble member to prevent removal of said shackle from said thimble opening, and wherein said capture block comprises first and second half members adapted to be affixed to each other within said thimble opening.

2. The apparatus of claim 1, wherein said first capture block member further comprises a first transverse bore extending through said first capture block member, said second capture block member further comprises a second transverse bore extending through said second capture block member, and an elongate fastener is disposed through said first and second transverse bores.

3. The apparatus of claim 2, wherein said elongate fastener comprises a security bolt.

4. The apparatus of claim 1, wherein said first capture block member further comprises a transverse bore extending through said first capture block member, said second capture block member further comprises an elongate pin, and said elongate pin is secured within said transverse bore.

5. The apparatus of claim 1, wherein said capture block has first and second outer side surfaces, and substantially concave grooves along said first and second outer side surfaces.

6. The apparatus of claim 5, wherein at least a portion of said thimble member is received within said substantially concave grooves.

7. An apparatus for securing a shackle within an opening of a sling loop thimble member comprising:
   a) a first capture block member wherein said first capture block member further comprises at least one transverse bore extending through said first capture block member;
   b) a second capture block member, wherein said second capture block member further comprises at least one transverse bore extending through said second capture block member; and
   c) an elongate fastener disposed through said aligned transverse bores, wherein said elongate fastener is adapted to affix said first capture block member to said second capture block member within said opening of said thimble member, and wherein said affixed capture block members restrict said opening of said thimble member to prevent removal of said shackle from said thimble opening.

8. The apparatus of claim 7, wherein said elongate fastener comprises a security bolt.

9. A method for preventing removal of a shackle from a sling loon having a thimble defining an opening, comprising:
   a) placing said shackle through said thimble opening; and
   b) fixedly installing a capture block assembly within said opening of said thimble, wherein said capture block restricts said opening of said thimble to prevent removal of said shackle from said thimble opening, wherein said capture block assembly comprises:
      i) a first capture block member;
      ii) a second capture block member; and
      iii) at least one fastener adapted affix said first capture block member to said second capture block member within said opening of said thimble, wherein said affixed capture block members restrict said opening of said thimble to prevent removal of said shackle from said thimble opening.

10. The method of claim 9, wherein said first capture block member further comprises at least one transverse bore extending through said first capture block member, said second capture block member further comprises at least one transverse bore extending through said second capture block member, and an elongate fastener is disposed through said aligned transverse bores.

11. The method of claim 10, wherein said elongate fastener comprises a security bolt.

12. The method of claim 9, wherein said first capture block member further comprises a transverse bore extending through said first capture block member, said second capture block member further comprises an elongate pin, and said elongate pin is secured within said transverse bore.

13. The method of claim 9, wherein said capture block assembly has first and second outer side surfaces, and substantially concave grooves along said first and second outer side surfaces.

14. The method of claim 13, wherein at least a portion of said thimble is received within said substantially concave grooves.

* * * * *